UNITED STATES PATENT OFFICE.

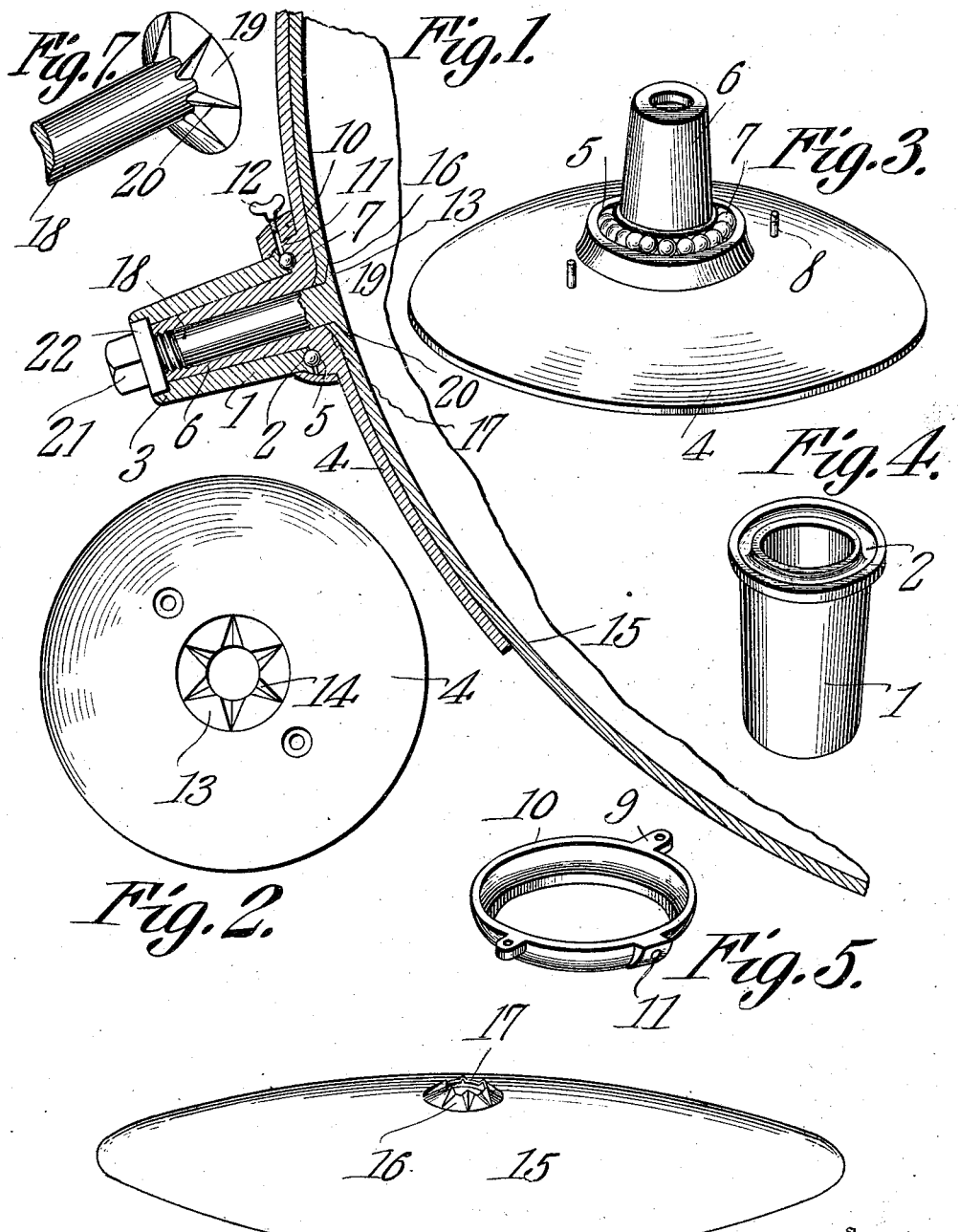

WILHELM G. DANIELSEN, OF INDEPENDENCE, MISSOURI.

DISK-MOUNT.

966,663.   Specification of Letters Patent.   Patented Aug. 9, 1910.

Application filed December 29, 1909. Serial No. 535,515.

*To all whom it may concern:*

Be it known that I, WILHELM G. DANIELSEN, a citizen of the United States, residing at Independence, in the county of Jackson and State of Missouri, have invented a new and useful Disk-Mount, of which the following is a specification.

This invention has relation to disk mounts adapted especially to be used upon rotary disk plows and it consists in the novel construction and arrangement of its parts as hereinafter shown and described.

The object of the invention is to provide a simple and durable structure of the character indicated. The disk is provided upon its forward face and at its center with a conical depression having an outer periphery in the form of a true circle and provided with radially disposed furrows and a support having a corresponding depression provided with similar furrows. A bolt is provided with a conical head which fits snugly in the depression in the disk and the said bolt is provided upon the rear side of its head with ridges which fit snugly in the furrows of the depression of the disk. The bolt passes transversely through the center of the said disk and support and is secured by means of a nut screw threaded upon its rear end.

In the accompanying drawing:—Figure 1 is a vertical sectional view of the disk mount. Fig. 2 is an elevation of a supporting plate used in the mount. Fig. 3 is a perspective view of said supporting plate. Fig. 4 is a perspective view of a sleeve used in the disk mount. Fig. 5 is a perspective view of a ring used in the disk mount. Fig. 6 is a perspective view of a disk used in conjunction with the disk mount. Fig. 7 is a perspective view of an end portion of a bolt used in the disk mount.

A sleeve 1 is provided at one end with a ball race 2 and at its other end with an annular recess 3. A supporting plate 4 is provided upon its rear side with a ball race 5 and a rearwardly disposed hub 6. Bearing balls 7 are located in the races 2 and 5 and serve as anti-friction means for journaling the hub 6 in the said sleeve 1. Bolts 8 pass transversely through the supporting plate 4 and also pass through lugs 9 located at opposite sides of a ring 10 which fits snugly around that portion of the supporting plate 1 having the ball race 5 and the adjacent end portion of the sleeve 1. The ring 10 is provided with an oil hole 11 which is normally closed by a plug or screw 12. The supporting plate 4 is provided at its center with a conical depression 13 which in turn is provided with a series of radially disposed furrows 14.

A centrally perforated disk 15 is provided at its center portion with a conical depression 16 having radially disposed furrows 17 formed in the forward side thereof. The depression 16 at its rear side is adapted to fit sungly in the depression 13 of the supporting plate 4 and the rear sides of the furrows 17 of the said depression 16 fit snugly in the furrows 14 in the said depression 13 of the supporting plate 4. The outer periphery of the depression 16 is in the form of a true circle and is concentric with the perforation at the center of the disk 15. The radially disposed furrows in the forward side of the depression 16 terminate at their outer ends in points located at the circular outer periphery of the said depression. A bolt 18 is provided with a conical head 19 which fits snugly in the depression 16 in the disk 15 and the said bolt 18 is provided upon the rear side of the head 19 with a series of radially disposed ridges 20 which are adapted to fit snugly in the furrows 17 formed at the forward side of the conical portion of the disk 15. The outer periphery of the head 19 of the said bolt is in the form of a true circle and is adapted to fit snugly in the conical depression 16 of the disk 15. The ridges 20 provided upon the rear side of the head 19 extend from the body portion of the bolt to the periphery of the head and terminate at their outer ends in points located at the periphery of the head and the said ridges are adapted to fit snugly in the furrows 17 formed in the depression 16 of the disk 15. The forward surface of the bolt head 19 is adapted to lie flush with the forward surface of the disk 15 and the said bolt passes through the hub 16 and serves as means for securely clamping the disk 15 in position upon the plate 4. A nut 21 is screw threaded upon the rear end of the bolt 18 and is provided with a peripheral flange 22 which fits snugly in the recess 3 formed at the rear end of the sleeve 1.

By reason of the fact that the conical depression in the central portion of the disk 15 is in the form of a true circle and the outer ends of the furrows 17 terminate in points located at the circular outer periphery of the depression 16, the said depression and furrows may be pressed or formed in the center of the disk without subjecting the material of which the disk is made to uneven strain. This will eliminate any tendency on the part of portions of the disk material to buckle or pucker and consequently the parts of the disk and disk mounts will at all times snugly interfit with each other. Again a maximum surface contact is established between the several parts which produces a well braced and rigid structure.

Having described the invention what I claim as new and desire to secure by Letters Patent is:—

A disk having at its center a perforation surrounded by a conical depression, the outer periphery of which is in the form of a true circle which is concentric with the perforation, said depression being provided upon forward surface with radially disposed furrows which terminate at their outer ends in points located at the circular outer periphery of the depression, a support for the disk, and a bolt passing through the disk and the support and having a conical head, the outer periphery of which is in the form of a true circle and which fits snugly in the conical depression in the disk, said conical head having upon its rear side radially disposed ridges which extend from the bolt to the periphery of the head and which terminate at their outer ends in points located at the periphery of the head and which fit snugly in said furrows.

In testimony that I claim the foregoing as my own, I have hereto affixed my signature in the presence of two witnesses.

WILHELM G. DANIELSEN.

Witnesses:
SAMUEL O. BENNION,
AMOS WOOD.